United States Patent [19]

Holmes et al.

[11] 3,907,829

[45] Sept. 23, 1975

[54] PRODUCTION OF 2,2-DISUBSTITUTED PROPIOLACTONES

[75] Inventors: Jerry D. Holmes; Robert P. Allen; John L. Dawes, all of Longview, Tex.

[73] Assignee: Eastman Kodak Company, Rochester, N.Y.

[22] Filed: Nov. 3, 1972

[21] Appl. No.: 303,567

[52] U.S. Cl. .............................. 260/343.9
[51] Int. Cl.² ........................... C07D 305/12
[58] Field of Search .................. 260/343.9

[56] References Cited
UNITED STATES PATENTS 2,462,357  2/1948  Caldwell et al. ............... 260/343.9
2,806,064  9/1957  McKlveen ..................... 260/343.9
3,201,474  8/1965  Hasek et al. .................. 260/343.9

Primary Examiner—Donald G. Daus
Assistant Examiner—Anne Marie T. Tighe
Attorney, Agent, or Firm—Edward R. Weber; Cecil D. Quillen, Jr.

[57] ABSTRACT

The present invention relates to a process for the manufacture of 2,2-disubstituted propiolactones from isoanhydrides and formaldehyde, as shown in the following equation:

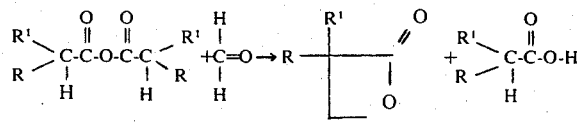

wherein R and R¹ individually may be a straight or branched chain alkyl, aryl or aralkyl group having 1 to 10 carbon atoms. The reaction is conducted in the presence of a metal oxide selected from the group consisting of Ag, U, Zn, Ti, Zr, Th, Ta, Nb, Mo, W, La, and Sn on a suitable support at a temperature of from about 190°C. to about 400°C.

18 Claims, No Drawings

PRODUCTION OF 2,2-DISUBSTITUTED PROPIOLACTONES

The present invention relates to a process for preparing 2,2-disubstituted propiolactones by the reaction of an isoanhydride with formaldehyde according to the following formula:

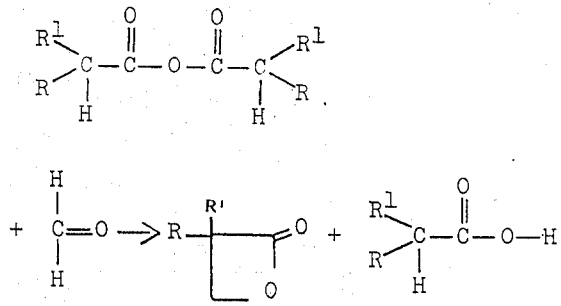

wherein R and $R^1$ individually may be a straight or branched chain alkyl, aryl, or aralkyl group having 1 to 10 carbon atoms, preferably 1 to 6 carbon atoms, at a temperature of from about 190°C. to about 400°C.

2,2-Disubstituted Propiolactones are useful in the polymer industry as a starting material for synthetic resins and synthetic fibers. They are also useful in the pharmaceutical industry and have heretofore been prepared by a variety of methods. For example, in U.S. Pat. No. 2,356,459, there is described a well-known method for preparing 2,2-disubstituted propiolactones by the addition reaction of dimethyl ketene and formaldehyde. The known methods for the manufacture of 2,2-disubstituted propiolactones, however, can be practiced on the commercial scale only with difficulties and resultant economic disadvantages.

It is, therefore, an object of our invention to provide a simplified method for the preparation of 2,2-disubstituted propiolactones.

It is another object to provide a one-step method for the preparation of 2,2-disubstituted propiolactones.

Other objects of the invention will become apparent from a consideration of the specification and claims of this application.

The prior literautre described a reaction of primarily aromatic aldehydes with anhydrides to give unsaturated acids. These reactions are normally conducted in the liquid phase using basic catalysts. Aliphatic aldehydes are usually unsuitable for this reaction. In the liquid phase, aldehydes normally react with anhydrides to form gem-diesters. For example, formaldehyde, when reacted with butyric anhydride, normally gives methylene dibutyrate (J. F. Walker, "Formaldehyde", 3rd Ed., ACS Monograph Series No. 152, Reinholt, p. 350). No prior literature is known which describes the condensation of aldehydes with acid anhydrides to produce lactones. It was therefore quite unexpected that formaldehyde could be made to condense in any significant amount with an anhydride to form a 2,2-disubstituted propiolactone.

In the process of the instant invention, an isoanhydride having the formula

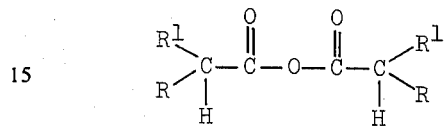

is condensed with formaldehyde to yield a 2,2-disubstituted propiolactone having the formula

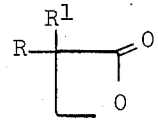

and an organic acid having the formula

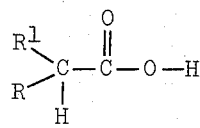

wherein R and $R^1$ individually may be a straight or branched chain alkyl, aryl or aralkyl group having 1 to 10 carbon atoms, preferably 1 to 6 carbon atoms. The reaction is catalyzed by heavy metal oxides selected from the group consisting of silver, uranium, zinc, titanium, zirconium, thorium, tantalum, niobium, molybdenum, tungsten, lanthanum, and tin supported on an appropriate support. These catalysts give almost complete reaction of formaldehyde with isobutyric anhydride to form pivalolatone and a secondary reaction product, isobutyroxypivalic anhydride. This byproduct appears to be formed from the secondary reaction of pivalolactone with isobutyric acid to form isobutyroxypivalic acid, which then interchanges with excess isobutyric anhydride as shown below.

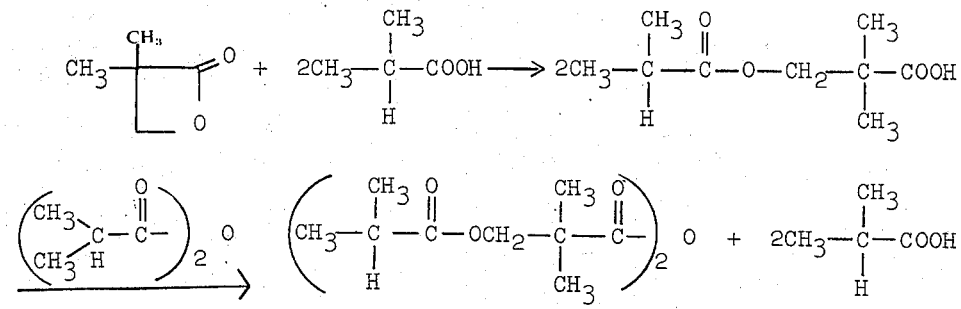

Metal oxides useful in this invention, in general, are amphoteric, which means they may act as an acid or a base, and in many cases act essentially neutral. In vapor phase reactions at elevated temperatures, it is very difficult to predict the extent or type of chemical activity a supported metal oxide possesses. It was not possible to predict that the various supported metal oxides described herein would catalyze the vapor phase condensation of formaldehyde with a substituted anhydride as has been discovered. The unpredictability of this discovery is further buttressed by the fact that other metal oxides which are sometimes effective catalysts, such as the oxides of nickel, iron, cobalt, and manganese, have been discovered to be essentially inactive in the instant invention.

The supported metal oxide catalysts of the instant invention are conveniently formed by mixing one of their water-soluble salts such as a nitrate, acetate, oxalate, or ammonium salt with a support and then removing the water by evaporation. Calcining the material in air at from about 400°C. to about 550°C., preferably about 500°C. to about 550°C., produces the desired metal oxide. If desired, the metal oxide can be precipitated directly upon the support by use of a suitable chemical reaction. Any of the known inert support materials can be utilized to support the heavy metal oxide. Typical useful supports are silica, alumina, celatom, pumice, and silicon carbide. A relatively low surface area (340 square meters per gram) and large pore volume (1.15 cc. per gram) silica gel was found to be particularly effective.

Optimum reaction conditions such as contact time, temperature, amount of diluent gas and feed composition will vary for the different metal oxide catalysts. In general, the best results are obtained at a contact time of from about 0.5 to about 2.0 seconds, although this may vary over a much broader range, such as from about 0.1 second to about 5.0 seconds.

Preferably the temperature selected will be sufficient to insure vaporization of the reactants and the products. The process may be operated at temperatures of from about 190°C. to about 400°C. A preferred temperature range is from about 240°C. to about 300°C.

Suitable anhydrides include isobutyric, 2-ethylhexanoic, 2-phenylpropionic, 2-ethylpropionic, 2-ethylbutyric, and 2-methylpentanoic.

Formaldehyde may be fed as a gaseous monomer, as a trioxane solution, or as a paraformaldehyde slurry. It has been found that the aldehyde conversion to lactone is dependent on the amount of anhydride fed. A molar ratio of from about 1.15:1 to about 5:1, preferably from about 3:1 to about 4:1 of anhydride to formaldehyde (as trioxane) in the feed mixture produces good results. The optimum ratio will depend upon various manufacturing considerations, such as refining and recycling of unreacted feed materials. There appears to be no upper limit to this ratio other than practical manufacturing considerations which arise when a large excess of one material is introduced into a system. In general, a higher anhydride to formaldehyde ratio gives higher formaldehyde conversion, but also decreases the percentage of lactone in the product.

The reaction may be carried out at atmospheric, subatmospheric, or superatmospheric pressure. If desired, an inert diluent gas may be utilized to facilitate feeding of the reactants, control of contact time, etc. Good results are obtained at atmospheric pressure using an inert diluent gas, usually in a molar ratio of gas to organic feed of from about 1:10 to about 20:1, preferably about 1:1 to 6:1, and most preferably from about 2:1 to 4:1. A suitable inert diluent gas is any gas which does not react with either the reactants or the products under the conditions of the reaction, such as $N_2$, argon, helium, gaseous hydrocarbons and compounds which are readily vaporized such as benzene.

The process of the invention is illustrated in greater detail by the following examples which are all conducted at atmospheric pressure, but it will be understood that these examples are not intended to limit the invention in any way, and obvious modifications will occur to those skilled in the art.

EXAMPLE 1

This example describes the preparation of stannous oxide on silica gel and illustrates its usefulness in the process. Davison G-59 (surface area 340 sq.m./g. — pore volume 1.15 cc/g.) silica gel (141 grams) is left standing for 20-24 hours in a solution of 32 grams stannous chloride dihydrate in 300 ml. of methanol. To this mixture is added 400 ml. ammonium hydroxide and the solvent is removed by evaporation. The catalyst (50 ml.) is charged to a 22 mm × 2 foot Vycor reactor and calcined in 500°-550°C. air for 3-4 hours. The reactor is cooled to 250°-265°C. and a nitrogen sweep of 1.25 moles per hour is started. A feed mixture consisting of a 3:1 molar ratio of isobutyric anhydride to formaldehyde (as trioxane) is fed at a rate of approximately 60 ml. per hour. Contact time is about 2 seconds. Over a 6 hour period formaldehyde conversion to pivalolactone averages 46 percent and isobutyric anhydride yield to pivalolactone is 66 percent.

EXAMPLE 2

This example illustrates a different method for depositing stannous oxide on silica. While stirring 235 grams (70.5 grams $SiO_2$) of DuPont AS colloidal silica (30 percent suspension in $H_2O$), 25.2 grams of stannous oxide is added. Solvent is removed by slow evaporation until a thick paste is obtained. The paste is taken to dryness and calcined at 500°C. for 3-4 hours. This material is then tested following the same procedure described in Example 1. Over a 5 hour period formaldehyde conversion to pivalolactone is 38 percent.

EXAMPLE 3

This example describes the preparation of tungsten oxide on silica gel and serves to illustrate its usefulness in the process. To a solution of tungstic acid (10 grams) in 300 ml. of water containing 25 ml. of concentrated ammonium hydroxide is added Davison G-70 (surface area 340 sq.m./gm. — pore volume 1.15 cc/g.) silica gel (100 grams), and the mixture is placed on a steam bath and evaporated to dryness over 24 hours to yield colorless granules. The catalyst (50 ml.) is charged to the Vycor reactor of Example 1 and heated at 450°C. in nitrogen for 48 hours and then in air for 2 hours. After cooling to 240°C., the reactor is fed an organic solution of 3:1 isobutyric anhydride to formaldehyde (as trioxane) at about 56 ml. per hour and sufficient nitrogen to produce a 4:1 nitrogen to organic ratio. Contact time is about 2 seconds. Over a 7 hour period formaldehyde conversion to pivalolactone is 39 percent and to isobutyroxypivalic anhydride is 29 percent.

EXAMPLE 4

This example describes the preparation of lanthanum oxide on silica gel and serves to illustrate its usefulness in the process. To a solution of lanthanum nitrate (13.3 grams) in 300 ml. of water is added Davison G-70 silica gel (100 grams), and the mixture is placed on a steam bath and evaporated to dryness over 24 hours to yield tan granules. The catalyst (100 ml.) is charged to the Vycor reactor of Example 1 and heated at 400°C. in nitrogen for 4 hours. After cooling to 230°C., the reactor is fed an organic vapor mixture of isobutyric acid, formaldehyde and isobutyric anhydride such that the ratio of anhydride to formaldehyde is 5:1. The vapor is diluted 2.7:1 with nitrogen and over a 4 hours period (contact time about 3 seconds) formaldehyde conversion to pivalolactone is 16 percent and to isobutyroxypivalic anhydride is 47 percent.

EXAMPLE 5

This example describes the preparation of molybdenum oxide on silica gel and serves to illustrate its usefulness in the process. To a solution of molybdenum oxide (5.3 grams) in 300 ml. of water containing sufficient ammonium hydroxide to effect complete solution is added Davison G-59 silica gel (70 grams), and the mixture is placed on a steam bath and evaporated to dryness over 24 hours to yield pale blue-green granules. The catalyst (50 ml.) is calcined in air at 500°C. for 12 hours, cooled, loaded into the Vycor reactor of Example 1, and heated to 250°C. in a stream of nitrogen. The reactor is fed an organic solution of 4:1 isobutyric anhydride to formaldehyde (as trioxane) at about 58 ml. per hour and sufficient nitrogen to produce a 2.6:1 nitrogen to organic ratio (contact time about 3 seconds). Over a 4 hours period formaldehyde conversion to pivalolactone is 20 percent and to isobutyroxypivalic anhydride is 13 percent.

EXAMPLE 6

This example describes the preparation of niobium oxide on silica gel and serves to illustrate its usefulness in the process. A 30 percent commercial niobium oxalate solution (67.6 grams) is diluted to 300 ml. with water and Davison G-59 silica gel (70 grams) is added. The mixture is heated on a steam bath and evaporated to dryness over 24 hours to yield colorless granules. The catalyst (50 ml.) is calcined in air at 500°C. for 12 hours, cooled, loaded into the Vycor reactor of Example 1, and heated to 250°C. in a stream of nitrogen. The reactor is fed an organic solution of 4:1 isobutyric anhydride to formaldehyde (as troxiane) at about 65 ml. per hour and sufficient nitrogen to produce a 5.3:1 nitrogen to organic ratio (contact time about 1.4 second). Over a 2 hours period formaldehyde conversion to pivalolactone is 30 percent and isobutyroxypivalic anhydride is 19 percent.

EXAMPLE 7

This example, when compared to Example 6, shows that increasing the contact time increases the amount of secondary product. Example 6 is repeated except the organic solution is fed at about 58 ml. per hour and sufficient nitrogen is used to produce a 2.1:1 nitrogen to organic ratio (contact time about 2.8 seconds). Over a 4 hour period formaldehyde conversion to pivalolactone is 28 percent and to isobutyroxypivalic anhydride is 39 percent.

EXAMPLE 8

This example, when compared to Examples 6 and 7, shows that shorter contact times reduce the tendency toward the secondary product. Example 6 is repeated except the organic solution is fed at about 67 ml. per hour, sufficient nitrogen is used to produce a 11.3:1 nitrogen to organic ratio (contact time about 0.7 second) and the temperature is 270°C. Over a 3 hour period formaldehyde conversion to pivalolactone is 31 percent and to isobutyroxypivalic anhydride is 21 percent.

EXAMPLE 9

This example describes the preparation of tantalum oxide on silica gel and serves to illustrate its usefulness in the process. A 17.4 ml. aliquot of a commercial tantalum oxalate solution (210 grams per liter as $Ta_2O_5$) is diluted to 300 ml. with water and Davison G-59 silica gel (60 grams) is added. The mixture is heated on a steam bath and evaporated to dryness over 24 hours to yield colorless granules. The catalyst (50 ml.) is calcined in air at 500°C. for 12 hours, cooled, loaded into the Vycor reactor of Example 1, and heated to 250°C. in a stream of nitrogen. Under conditions the same as those of Example 5 over a 4 hour period the formaldehyde conversion to pivalolactone is 44 percent and to isobutyroxypivalic anhydride is 22 percent.

EXAMPLE 10

This example illustrates the use of zinc oxide on silica gel. The catalyst is prepared by stirring together zinc chloride and Davison G-59 silica gel in acetone. The product is washed with ammonia and dried. A 100 ml. sample of the catalyst containing 7 percent zinc oxide is charged to the Vycor reactor of Example 1 and calcined at 550°C. A 3:1 nitrogen to feed ratio is used and a 3:1 isobutyric anhydride to formaldehyde (as trioxane) mixture is fed at a 2 second contact time at 300°C. During a 5.7 hour run a 27 percent conversion of formaldehyde to pivalolactone and a 12 percent conversion of formaldehyde to isobutyroxypivalic anhydride are obtained. This corresponds to a 39 percent conversion of formaldehyde to pivalolactone products.

EXAMPLE 11

This example illustrates the use of uranium oxide on silica gel (Davidson G-59). A catalyst of uranium acetate on silica gel is prepared containing 10 percent uranium. A 100 ml. sample of the catalyst is charged to the Vycor reactor of Example 1 and calcined at 550°C. A 3:1 nitrogen to feed ratio is used and a 3:1 isobutyric anhydride to formaldehyde (as trioxane) mixture is fed at a 2 second contact time at 300°C. The conversion of formaldehyde to pivalolactone products is 69 percent (22 percent to pivalolactone and 47 percent to isobutyroxypivalic anhydride).

EXAMPLE 12

This example illustrates the use of zirconium oxide on silica gel (Davison G-59). Silica gel is treated with zirconium nitrate to give a product with 10 percent zirconium. A 100 ml. sample is charged to the Vycor reactor of Example 1 and calcined at 525°C. A 3:1 nitrogen to feed ratio is used and a 3:1 isobutyric anhydride to formaldehyde (as trioxane) mixture is fed at a 2 second contact time at 300°C. The conversion of formaldehyde to pivalolactone products is 74 percent (26 percent to pivalolactone and 48 percent to isobutyroxypivalic anhydride).

EXAMPLE 13

This example illustrates the use of silver oxide on silica gel (Davison G-59). A catalyst of silver nitrate on silica gel is prepared containing 10 percent silver. A 100 ml. sample of the catalyst is charged to the Vycor reactor of Example 1 and heated to 525°C. to drive off the oxides of nitrogen. A 3:1 nitrogen to feed ratio is used and a 3:1 isobutyric anhydride to formaldehyde (as trioxane) mixture is fed at a 2 second contact time at 300°C. The conversion of formaldehyde to pivalolactone products is 48 percent (38 percent to pivalolactone and 10 percent to isoburyroxypivalic anhydride).

EXAMPLE 14

This example illustrates the use of thorium on silica gel. A catalyst of thorium nitrate on silica gel (Davison G-59) is prepared containing 10 percent thorium. A 100 ml. sample of the catalyst is charged to the Vycor reactor of Example 1 and heated to 550°C. to remove the oxides of nitrogen. A 3:1 nitrogen to feed ratio is used and a 3:1 isobutyric anhydride to formaldehyde (as trioxane) mixture is fed at a 2 second contact time at 300°C. The conversion of formaldehyde to pivalolactone products is 58 percent (34 percent to pivalolactone and 24 percent to isobutyroxypivalic anhydride).

EXAMPLE 15

This example illustrates the use of titanium oxide on silica gel (Davison G-59). A catalyst of titanium tetraisopropoxide on silica gel is prepared containing 10 percent titanium. A 100 ml. sample of the catalyst is charged to the Vycor reactor of Example 1 and heated to 525°C. in air. A 3:1 nitrogen to feed ratio is used and a 3:1 isobutyric anhydride to formaldehyde (as trioxane) mixture is fed at a 2 second contact time at 250°C. The conversion of formaldehyde to pivalolactone products is 58 percent (15 percent to pivalolactone and 43 percent to isobutyroxypivalic anhydride).

The invention has been described in detail with particular reference to preferred embodiments thereof, but it will be understood that variations and modifications can be effected within the spirit and scope of the invention as described hereinabove.

We claim:

1. A process for producting a 2,2-disubstituted propiolactone having the formula

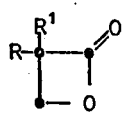

whereby an isoanhydride having the formula

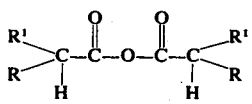

wherein R and $R^1$ individually may be straight or branched chain alkyl, having 1 to 10 carbon atoms, is reacted with formaldehyde or a formaldehyde yielding material at a temperature of from about 190°C. to about 400°C., in the presence of a catalyst consisting essentially of an oxide of a metal selected from the group Ag, U, Zn, Ti, Zr, Th, Ta, Nb, Mo, W and supported on an inert support.

2. The process of claim 1 wherein R or $R^1$ individually is straight or branched chain alkyl of 1 to 6 carbon atoms.

3. The process of claim 1 wherein the isoanhydride is selected from the group consisting of isobutyric anhydride, 2-ethylhexanoic anhydride, 2-phenylpropionic anhydride, 2-ethylbutyric anhydride, and 2-methylpentanoic anhydride.

4. The process of claim 1 wherein the support material is selected from the group consisting of silica, alumina, celatom, pumice, and silicon carbide.

5. The process of claim 1 wherein the catalyst is formed by mixing a water-soluble salt of the selected heavy metal with the selected support, removing the water by evaporation, and subsequently calcining the material at a temperature of from about 400°C. to about 550°C.

6. The process of claim 5 wherein the calcining takes place at a temperature of from about 500°C. to about 550°C.

7. The process of claim 1 wherein the reaction is conducted at a temperature of from about 240°C. to about 300°C.

8. The process of claim 1 wherein the reaction is conducted at atmospheric pressure.

9. The process of claim 1 wherein the ratio of anhydride fed to aldehyde is from about 1.15 to 1 to about 5 to 1.

10. The process of claim 9 wherein the ratio of anhydride fed to aldehyde is from about 3 to 1 to about 4 to 1.

11. A process for producing pivalolactone wherby isobutyric anhydride is reacted with formaldehyde at a temperatue of from about 190°C. to about 400°C. in the presence of a catalyst consisting essentialy of an oxide of a metal selected from the group Ag, U, Zn, Ti, Zr, Th, Ta, Nb, Mo, W, and supported on an inert support.

12. The process of claim 11 wherein the supporting material is selected from the group consisting of silica, alumina, celatom, pumice, and silicon carbide.

13. The process of claim 11 wherein the catalyst is formed by mixing a water-soluble salt of the selected heavy metal with the selected support, removing the water by evaporation, and subsequently calcining the material at a temperature of from about 400°C. to about 550°C.

14. The process of claim 13 wherein the calcining takes place at a temperature of from about 500°C. to about 550°C.

15. The process of claim 11 wherein the reaction is conducted at a temperature of from about 240°C. to about 300°C.

16. The process of claim 11 wherein the reaction is conducted at atmospheric pressure.

17. The process of claim 11 wherein the ratio of anhydride fed to aldehyde is from about 1.15 to 1 to about 5 to 1.

18. The process of claim 17 wherein the ratio of anhydride fed to aldehyde is from about 3 to 1 to about 4 to 1.

* * * * *